United States Patent [19]

O'Sullivan et al.

[11] Patent Number: 5,357,482
[45] Date of Patent: * Oct. 18, 1994

[54] WELL INSPECTION METHOD

[75] Inventors: Terence P. O'Sullivan, East Kalimantan, Indonesia; William C. Allen, Pasadena, Calif.

[73] Assignee: Union Oil Company of California, Los Angeles, Calif.

[ * ] Notice: The portion of the term of this patent subsequent to Dec. 10, 2008 has been disclaimed.

[21] Appl. No.: 796,416

[22] Filed: Nov. 22, 1991

Related U.S. Application Data

[63] Continuation-in-part of Ser. No. 473,227, Jan. 31, 1990, Pat. No. 5,072,388.

[51] Int. Cl.$^5$ .................. G01V 1/40; G01N 29/04
[52] U.S. Cl. ........................... 367/35; 181/105; 73/155
[58] Field of Search ............ 367/25, 26, 30, 32, 367/35; 181/105; 73/151, 155, 598; 364/422, 806

[56] References Cited

U.S. PATENT DOCUMENTS

| | | | |
|---|---|---|---|
| 3,883,841 | 10/1975 | Norel et al. | 340/15.5 A |
| 4,255,579 | 3/1981 | Havira | 367/35 |
| 4,255,798 | 3/1981 | Havira | 367/35 |
| 4,685,092 | 7/1987 | Dumont | 367/35 |
| 4,703,427 | 10/1987 | Catala et al. | 364/422 |
| 4,751,461 | 1/1988 | McWhirter et al. | 324/221 |
| 4,758,956 | 3/1988 | Duffy | 364/422 |
| 4,783,771 | 12/1988 | Paulsson | 367/57 |
| 4,843,317 | 9/1989 | Dew | 324/221 |
| 4,912,683 | 3/1990 | Katahara et al. | 181/105 |
| 4,928,269 | 5/1990 | Kimball et al. | 181/105 |
| 4,953,147 | 8/1990 | Cobb | 73/598 |
| 4,970,695 | 11/1990 | Huau | 367/35 |
| 5,031,467 | 7/1991 | Rambow | 73/155 |
| 5,072,388 | 12/1991 | O'Sullivan et al. | 181/105 |

OTHER PUBLICATIONS

"Cement Evaluation in Fiberglass Casing: A case for Pulse Echo Tools"; Rambow, SPWLA 29th Annual Logging Symposium, Jun. 1988.
"Corrosion and Electrical Impedance in Concrete", by Hope, Ip, and Manning, pp. 525–534 of Cement and Concrete Research, 1985.
"Cement Evaluation Tool (CET)" pp. 253–257, of Cased-Hole Log Analysis and Reservoir Performance Monitoring, by Bateman, 1985, Boston.
Affidavit of Prior Art for Serial No. 07/473,227 filed Jan. 31, 1990.
"Interpretive Processing System (IPS) Manual", Chapter 7, and pp. 8–16, by Geo Quest International, Inc, Jul. 1983.
"A Comparison of New Ultrasonic Cement and Casing Evaluation Logs with Standard Cement Bond Longs," by Sheives, Tello, Maiti, Standlen, and Blankinship, Society of Petroleum Engineers, 1986.
"CET: Acoustic Corrosion Evaluation", p. 32 of Corrosion Evaluation, by Schlumberger, 1988.

*Primary Examiner*—Nelson Moskowitz
*Attorney, Agent, or Firm*—Gregory F. Wirzbicki; William O. Jacobson

[57] ABSTRACT

A differential analysis method can be used to determine the presence or absence of a fluid in contact with a tubing string within a wellbore. The method uses a signal generator and detects tubing-perturbed signals, searches for an initial interfacial indicator within a window, axially aligns indicators within a data series as the detector traverses the tubing, discerns an adjacent interfacial indicator known to be incrementally changed by the presence of the fluid, and compares the adjacent indicators to the known incremental change. Even if the absolute location or condition of the interface is uncertain, the relative change indicates the presence or absence of fluid. A prior condition indicator can also be used to determine a second window for detecting an adjacent surface signal indicators. The arbitrary or prior condition baseline avoids the need to "know" the actual properties of intervening materials currently required for analysis of casing conditions and some of the extrapolation limitations inherent in current analysis methods. The method can also achieve accurate results by iterating on the initial indicator.

21 Claims, 4 Drawing Sheets

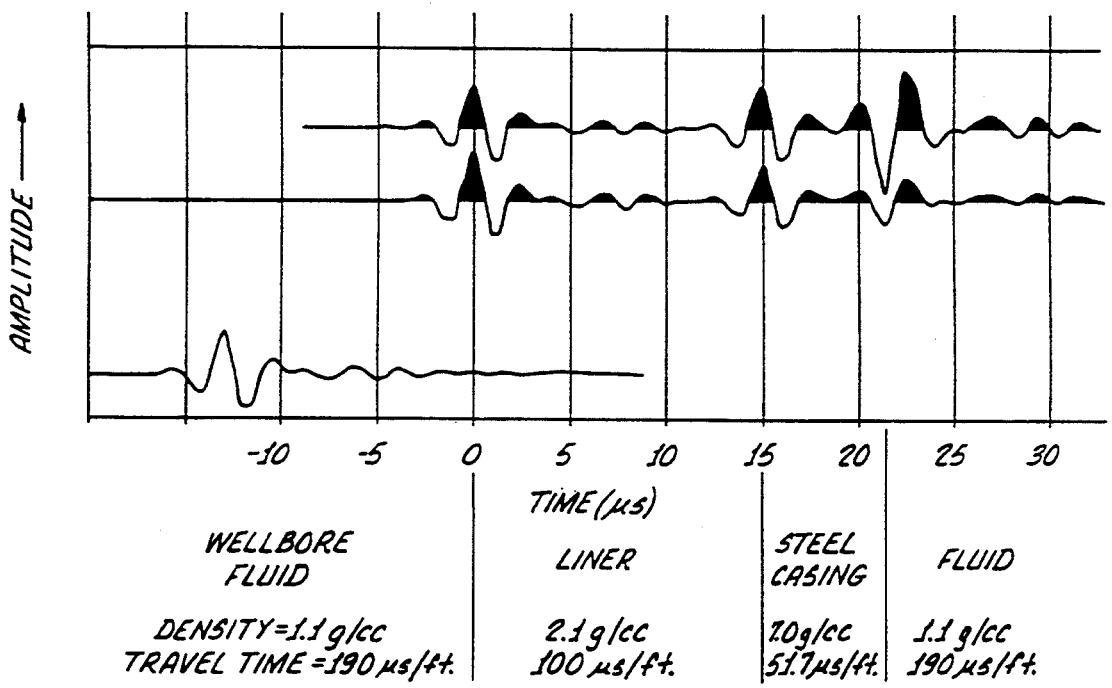
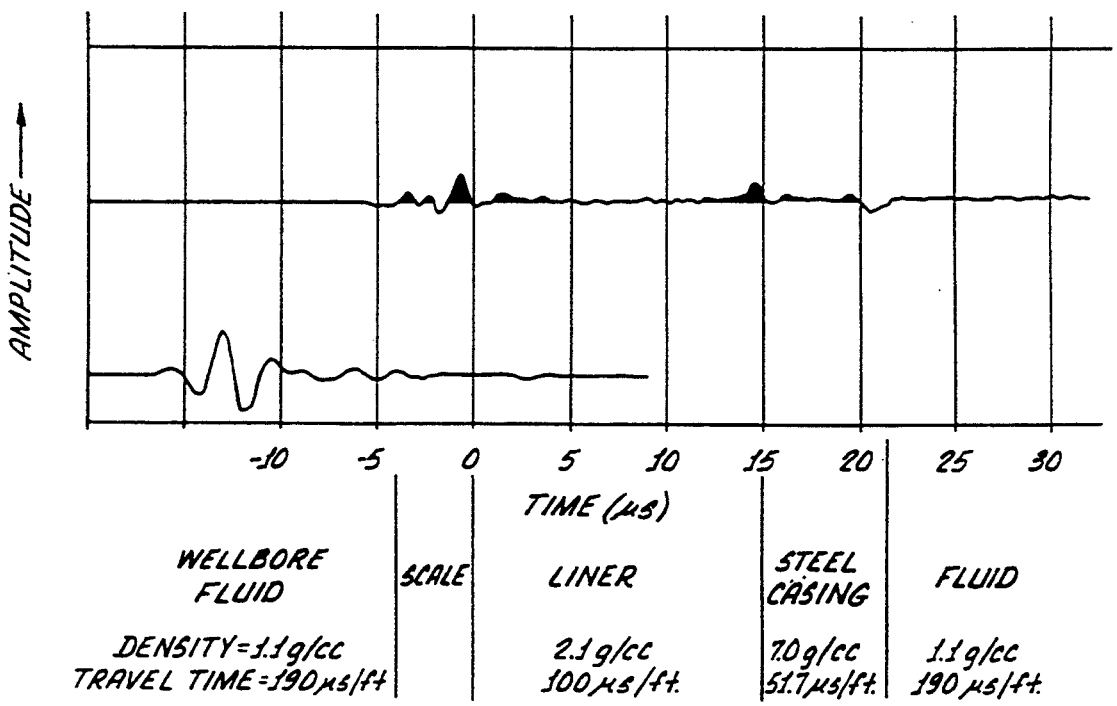

WELL INSPECTION METHOD

This application is a continuation-in-part of: (1) copending application Ser. No. 473,227, filed Jan. 31, 1990, now U.S. Pat. No. 5,0723,88. The prior filed application is incorporated in its entirety herein by reference.

FIELD OF THE INVENTION

This invention relates to the analysis of well logs. More specifically, the invention concerns a method to determine the presence or absence of fluid behind a tubing or casing string within a borehole using data from logging instruments.

BACKGROUND OF THE INVENTION

Many natural resource industry activities involve determining the unknown or generally uncertain condition of a well having a metallic casing or other tubing strings cemented or hung in a wellbore. Tubing strings are used to handle fluids produced from or injected into an underground formation. Certain formation (or other) fluids, such as geothermal fluids, may present especially difficult corrosion and other fluid handling problems. Therefore, multi-layered construction (e.g., interior and exterior barrier layers composed of a fluid resistant material such as cement or concrete covering a steel pipe) may be used to handle difficult, corrosive, erosive and scaling fluids.

The presence or absence of fluids behind the tubulars of the underground well should be determined periodically to safely operate a well in a difficult application. Even if tubulars are cemented to a formation, formation fluid behind a cemented liner or a cemented casing can permeate the cement and corrode the liner or casing and cause cement failure, resulting in possible unsafe operation. Since removal of a cemented casing is impractical, in-situ inspection of tubulars and fluids is required. Even when tubulars are not cemented, in-situ inspection is preferable.

In-situ well inspections are currently accomplished using various logging tools and instruments. Some instruments project pressure (e.g., ultrasonic) or electromagnetic waves spherically/radially outward from near the tubular axis and detect returning waves (i.e., waves affected by the casing/cement materials and interfacial conditions). The instruments detect the induced or reflected signals/waves (i.e., perturbed signal) resulting from an interaction between the generated signal and the surrounding materials. The detected perturbed signal indicates and represents one or more casing or cement conditions. Some instruments are supported by a wire line and have two or more receivers placed at different locations. Other instruments may have different orientations for transmitter(s) and receiver(s) so as to obtain radial and/or directional information on conditions at a given depth. Material types and interfaces are detected by "known" changes in the perturbed (reflected or induced) signals.

Normally, the initial (i.e., first radially outward) material/interfacial surface most strongly perturbs the signal, especially for sonic signals. Signals coming from subsequent interfaces (i.e., surfaces) or materials must be corrected for the perturbations caused by the initial material and interface (i.e., subsequent return signals must pass through intermediary signal perturbing materials/surfaces after first passing through them to reach the outermost surface of interest). Thus, unless the initial materials and surfaces do not affect the wave (i.e., are relatively transparent to the signal), the condition of the exterior of a casing or formation radially outward from the casing must be determined from signal analyses which correct for known signal perturbing intermediary material/interfaces.

Besides the effects produced by the presence of intermediary materials of interest, existing instruments detect other signal perturbing influences. These influences include those identified with fluids present within the tubing or casing, fluids occupying the annular spaces between tubing and casing strings, fluids between casing strings, and fluids between a casing string and the bore hole. Other influences include the underground formation, formation fluids, and the formation geometry. These fluid and other perturbing influences must also be considered in the analysis of the detected signal to accurately determine the presence or absence of fluid contacting the outward facing surface of the tubing or cement.

Existing detected signal analysis methods generally use an idealized model with assumptions. The model treats the detected signals as perturbed by nominal or ideal signal perturbing conditions. For example, an idealized data analysis may assume a perfectly cylindrical steel casing, a composition of a wellbore fluid, and a homogeneous and infinitely thick formation layer (i.e., data are not affected by the formation boundaries). These models then provide idealized corrections for "known" perturbing factors.

However, the discrete surface or condition affected components of a signal (i.e., indicators) may be hidden in the data (e.g., signal characteristics obscured by a low signal to noise ratio) in difficult applications. In addition, some perturbing influences or factors may not be "known," making proper corrections difficult or impossible. For example, a deposit of a magnetically active scale having unknown magnetic properties will perturb induced electromagnetic signals carrying information with respect to a metallic casing wall. Failure to accurately identify or "know" of the presence of an intervening signal perturbing material(s) compromises all other data. This has led to the inadequate detection of unsafe in-situ casing and cement conditions caused by the presence of fluids.

All of the current in-situ analysis methods known to the inventors to detect the presence or absence of external fluids either will not work when an unknown intervening material is present, or they require a distinct intervening material signal to correct the perturbed signal, or they require a signal which is not affected by intervening materials, or they require an independent knowledge of factors which perturb the signal.

SUMMARY OF THE INVENTION

The present invention consists of a "differential" analysis method which enables one to determine the casing and fluid conditions from existing in-situ instrument data even when an unknown amount of multiple signal perturbing influences, such as a scale, casing corrosion, and corrosion by-products, are present. The present invention is, at least in part, founded on the discovery that one can consistently identify a casing reference indicator in the data, shift and align the data to a selected reference indicator, and determine casing and fluid conditions relative to the reference indicator regardless of the distortions to the detected signals caused by other perturbing influences. For a fluid contacting surface, changes or differences in the corresponding peak amplitude of the signal representing that surface can be related to fluid changes.

For sonic data, the method calls for the stacking of a series of signals and the alignment of adjacent reference interfacial indicators to an arbitrarily selected or a previous baseline condition indicator and detecting changes in the amplitude of the fluid-contact surface signals. Differences between in-situ and a previous surface baseline (e.g., non-scaled/no fluid) condition for the reference indicator can also be used to determine the phase and size of a differential window for subsequent use.

A second differential window is calculated to detect otherwise masked or unknown locations of perturbed indicators of material interfaces or fluids adjoining the reference interface. Comparison (e.g., subtraction) of indicators within the second window can produce an accurate indication of the unknown condition, such as the presence of formation fluid contacting the tubing surface or cement, independent of intervening signal perturbing effects. Correlation of these compared signal indicators can also be used to re-align the reference indicator, i.e., the method can be iterated.

The alignment and window computations used in the present invention are initially based upon a theoretical model of signal(s) radially traversing the casing interfaces and adjoining materials. But the method avoids the need to correct for the effects produced on the wave by "known" intervening materials and interfacial surfaces. By backing into the calculation using an assumed value from shifted indicators and through the use of iteration, the method can uncover previously masked information. Once the outer surface signal indication is identified, it can be used to determine the presence or absence of fluids or confirm the presence indicated by other independent logged or data sources, if used.

BRIEF DESCRIPTION OF THE DRAWINGS

FIG. 2 shows a calculated time response trace of a lined casing in a baseline condition;

FIG. 3 shows a calculated time response trace in a scaled condition;

DESCRIPTION OF THE PREFERRED EMBODIMENT

Figure 1:
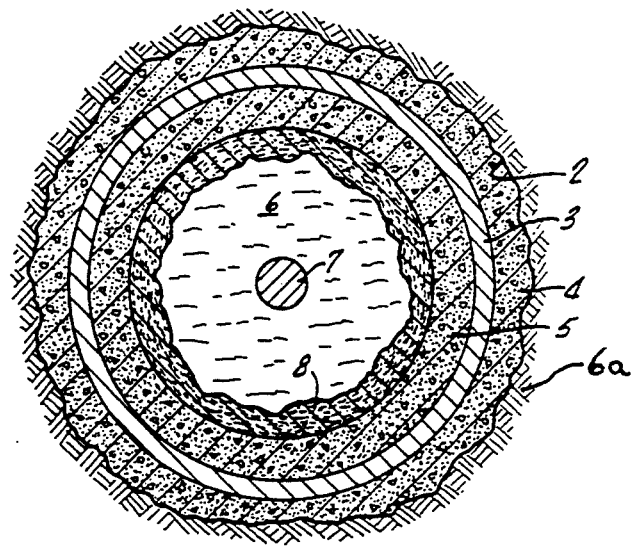
FIG. 1 shows a cross sectional view of a lined casing cemented in a wellbore.

FIG. 1 shows an underground cross sectional view of a fluid conduit or metallic casing 3 in a geothermal formation wellbore 2 (in a geothermal wellbore) looking generally down along the axis of the wellbore 2. The metallic casing 3 (e.g., joined steel pipe sections) is attached to the edges of the underground formation (forming the wellbore 2) by cement 4. A concrete liner or protective barrier 5 is bonded to the interior of the casing 3 to protect the steel or other structural element of the casing 3 from contact with a conducted geothermal fluid stream 6. The geothermal fluid stream flow is up or down the wellbore 2 (i.e., into or out of the plane of the paper as shown in FIG. 1). Formation (or other) fluids 6a may contact the outer portions of the cement and extend radially outward.

A wire line instrument 7 immersed in geothermal fluid stream 6 is shown placed at the center of the cylindrical casing 3. Instrument 7 produces and radially projects an electromagnetic field, or pressure waves (or other discrete waves or signals) into the casing 3. The field or waves interact with (among other things) the liner 5, casing 3, cement 4, and formation fluid 6a. The preferred signal is a sonic or ultrasonic wave. The logging instrument 7 is lowered or raised (i.e., the casing is traversed by the instrument) to obtain a series of affected data or discernible signals containing information (i.e., indicators) on the various fluids, materials, and material interfaces present.

Similar to the configuration shown in FIG. 1 is a configuration (not shown) replacing the single string 3 with multiple (concentric) tubing or casing strings proximate to each other. Each of the multiple strings would have different diameters and an annulus would be typically formed between the concentric strings. The annulus may be filled with cement 4, air, internal fluid 6, formation fluid 6a or other material. The present invention can also be used to detect the presence or absence of material contacting the strings 3 in this concentric annulus along the length of the strings similar to the preferred method of detect the presence or absence of fluid contacting the exterior of the assembly.

Material interfaces representing impedance contrasts tend to reflect and return sonic signals. The presence or absence of fluid, such as formation fluid 6a, at a material interface tends change the impedance contrast and therefore affects the reflected and returned signals. Affected signals are used to determine a condition (e.g., interface location, wall thickness, and surface conditions) of the casing 3 and/or cement 4.

A pressure (e.g., sonde) instrument 7 generates sonic or ultrasonic waves. This type of instrument has been typically used previously to determine the condition of the cement 4 bond (e.g., a Cement Evaluation Tool). If multiple radial element signal detectors are used in an alternative embodiment, an averaged radial signal at each depth location traversed may also be produced.

Scale 8, chemical and mechanical alteration of the casing liner 5, and intrusions of a different or unknown fluids 6 or 6a may mask, distort and perturb the reflected wave, including the portion serving as a surface indicator, detected by the instrument 7 by an unknown amount. For example, the liner 5 may be permeable, allowing fluid 6 to penetrate the liner 5, damping the sonic signals by an unknown amount. For geothermal applications, a layer of scale 8 (primarily deposits formed by precipitation from fluid 6) can severely mask and alter sonic or electromagnetic signals.

Geothermal scale 8 may also contain ferrous or other particles which can be electromagnetically interactive and present multiple interfaces which scatter the signal. The density of a geothermal scale 8 may also vary widely or form multiple layers, depending upon operating conditions. The scale may be soft or even fluid-like (e.g., viscous) and the scale 8 to fluid 6 interface (initial or intervening material interface) may be undulating, making the reflected signal from more distant interfaces indistinct. The fluid 6 adjacent to the scale 8 may also be layered (i.e., have a fluid boundary layer possessing similar signal perturbing properties as the scale 8), making resolution of the initial interfacial indicator less distinct within the detected signal.

Changes in formation fluid 6a may result from casing leaks (i.e., geothermal fluid 6 could be the same as the formation fluid 6a), migration of naturally occurring fluids, well drawdown, and fluid injection. The formation fluid may also scale or salt out near the casing interface.

These fluid, scale, liner, metallic casing, cement, and formation properties and conditions can blur or perturb the indicator(s) such that a safe operating condition can not be determined using existing signal analysis methods. The perturbations may blur the indicators to the extent that no clear signal indicator is discernible, making an assessment of the properties and conditions impossible. In addition, independent knowledge of the in-situ casing, liner, and scale conditions may not be feasible. For example, the liner may be altered by erosion or corrosion, and the altered liner may also be covered with a soft scale. The locations of the soft scale and the undulating altered casing liner interfaces may even be difficult or impossible to determine using other independent forms of measurement.

FIG. 2 illustrates a calculated time response trace 10 generated from a source signal 9 in a lined casing using a Cement Evaluation Tool (CET) instrument. The instrument produces a discrete sonic impulse signal or distinct wave. The "liner" used in this example is approximately 2.3 cm (0.9 inch) thick cement while the "steel" (structural layer of the lined casing as shown in FIG. 1) is 1.9 cm (0.75 inch) thick. The CET instrument may also measure the velocity of the signal in geothermal fluid 6 (see FIG. 1) to correct for "known" fluid effects. The "casing" in this example is not cemented to the formation as shown in FIG. 1, but similar trace responses can be obtained and corrections made for cemented casing. The calculated response trace 10 can be further corrected using the raw trace 11 for transmission loss through each material When the location and properties (e.g., density and travel times shown in FIG. 2) of the intervening signal affecting materials and interfaces are known. As discussed above, the properties and locations of intervening signal affecting materials are not always known in some subsurface applications, such as encountered in geothermal energy extraction.

Similar to FIG. 2, FIG. 3 illustrates a raw time response trace 12 which resulted when a distinct source signal 9 was radially projected. The signal was again reflected from a lined casing not cemented to the wellbore as in FIG. 2, but now in a scaled condition. The scale creates a first (wellbore fluid to scale) interfacial indicator. Although distinct in the trace shown in FIG. 3, the first interfacial indicator may also be masked and essentially indistinct from other signal noise. The intervening scale also shifts the location and reduces the amplitude of other indicators, thus perturbing the second (scale/liner) and subsequent interfacial signal indicators of interest. A corrected trace, similar to the calculated trace 10 shown in FIG. 2, is not possible without more specific knowledge of the scale properties, and is therefore not shown.

Figure 4:
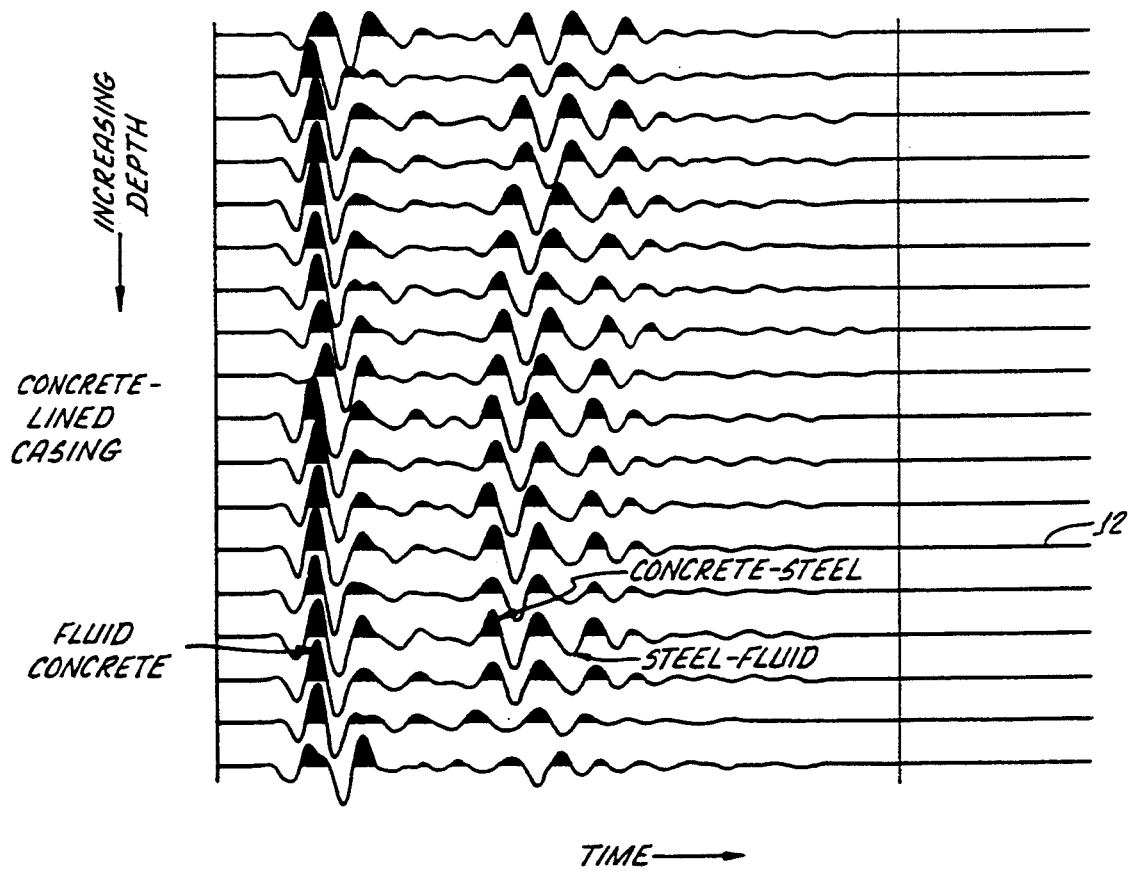
FIG. 4 shows a series of traces from sections of unlined casing in a baseline condition.

FIG. 4 illustrates a series of raw traces 12 (see FIG. 3) obtained over a small depth interval in a well where sections of lined casing had been installed. The positive displacement "peaks" are filled in for clarity (as opposed to negative/downward displacement "troughs"). The raw traces were obtained prior to operation (i.e., no scaling or erosion). The traces are from a portion of lined casing section near a joint (proximate to the bottom traces shown). The traces 12, also having "peaks" filled in for clarity, represent a baseline alignment of raw signals (i.e., stacked signals) obtained for a series of subsurface depths. The peaks (and troughs) are caused by the noted material interfaces: "FLUID-CONCRETE," "CONCRETE-STEEL," and "STEEL-FLUID." If the string were cemented (See cement 4 in FIG. 1), the "STEEL-FLUID" interface location and peak would be altered, and represent the STEEL-CEMENT interface (not shown). The baseline traces may be obtained in-situ or prior to running the casing. Traces from unlined casing sections may also be obtained in a similar manner.

Perturbed indicators in the signal can be caused by many operational conditions which can obscure the indicators of a major problem condition. Obscuring conditions are primarily related to inhomogeneous fluids, scale, and liner properties. Obscuring conditions include the presence of micro-fractures in cement, fluid and liner gradients (e.g., density gradients), variable layering, and fluid permeation into the liner.

Figure 5:
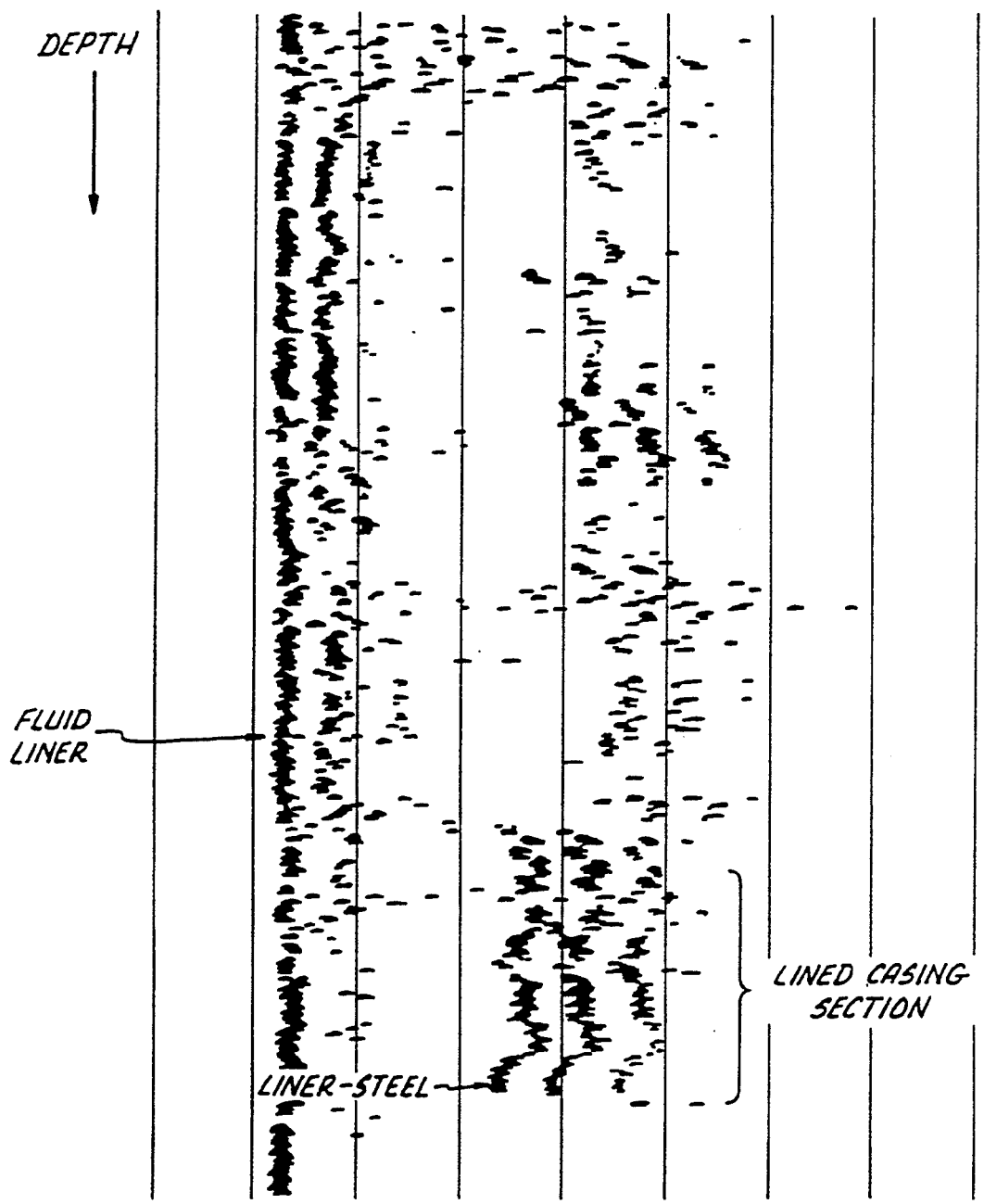
FIG. 5 shows a series of traces from sections partially simulating unknown liner and scale conditions.

Shown in FIG. 5 is a larger portion of a series of stacked raw traces (similar to traces 12 shown in FIG. 4) obtained from a CET transducer when traversing a portion of a test wellbore constructed to simulate several signal perturbing conditions. Only the filled in "peaks" are shown for clarity. The wellbore consisted of different test casing sections joined to partially simulate an eroded and scaled liner. The test section was composed of sections of lined cement (rather than the concrete lined casing shown in FIG. 1) casing wherein the liner cement type and curing method had been deliberately varied for each section. The unequal liner properties perturbed the sonic signal indicators in a manner similar to erosion/scaling, but in this instance the signal perturbing cement properties were generally known for testing purposes.

The sonic logging CET (see instrument 7, FIG. 1) was inserted in the well bore tubulars and a traverse along the wellbore axis was made while obtaining a number of signal traces 12 (see FIG. 4) and "peaks" shown in FIG. 5. As expected, clear indications ("peaks") of the initial inner "fluid-liner" interface were detected. Although perturbed in amplitude and location, the subsequent "liner-steel" interfacial indicator (an indication of a metallic tubular condition is typically a major objective of logging) is a "trough" (not shown for clarity) just before another "peak" (shown in FIG. 5) and is also easily detected in the data. The variability in the cement properties (simulating conditions after handling a difficult fluid, such as a geothermal fluid) have resulted in the significant displacement of the "liner-steel" interface indicators for each "lined casing section", while the "fluid-liner" (contained fluid contacting) interfacial indicators remain aligned (verifying data accuracy). In normal logging to determine the condition of the steel casing cemented in an operating geothermal well and the presence of fluid at the cement-formation interface, the initial fluid interfacial indicators are also expected to be masked and displaced, but are still detectable if a narrow window can focus on the correct portions of the data.

Figure 6:
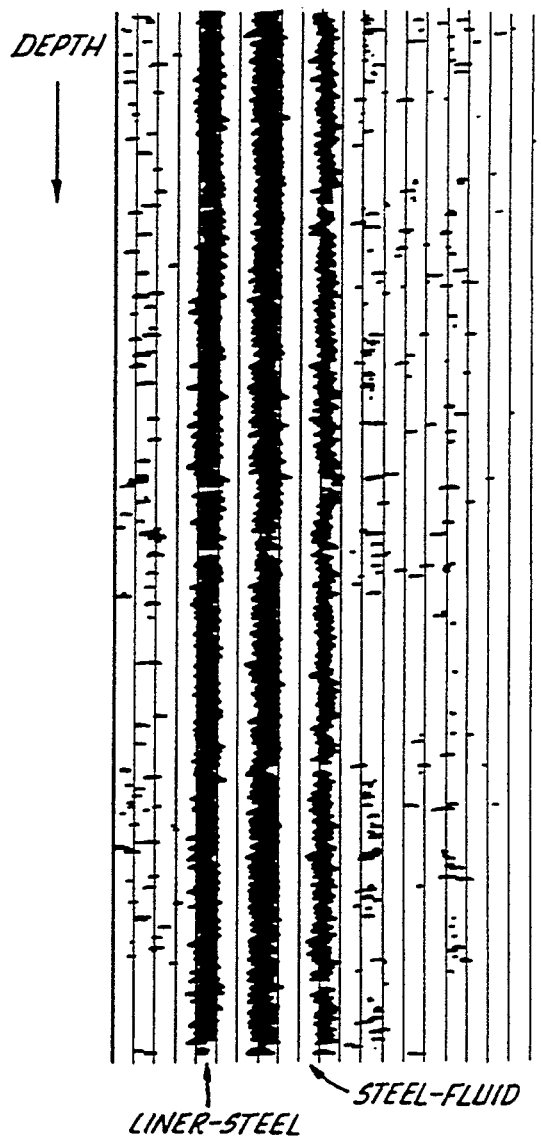
FIG. 6 shows the same series of traces as shown in FIG. 5 after the waveforms were aligned on the cement-steel interface.

FIG. 6 illustrates a series of peaks after the raw waveforms 12 (shown in FIG. 4 and 5) were aligned on a selected "liner-steel" interfacial indicator, i.e., a reference indicator. As shown, the "peaks" are aligned, but the alignment is actually accomplished using the preceding "troughs" (not shown for clarity) which represent the "liner-steel" interface. Similar to FIG. 5, only the peaks are shown for clarity. The test inner "fluid-liner" interfacial indicators (shown in FIG. 5) have also been deleted for clarity. In an alternative embodiment, an indicator baseline (signals from known conditions of the lined casing) is available and is used in place of the reference indicator. Shifting and alignment is based upon the position of a first reference or baseline window (specifying a time response range where the reference indicator is expected) and a cross-correlation routine, correlating the signal traces.

The first reference window location and size is calculated based upon an assumed reference indicator location and an expected range of variation about the assumed location. The reference window is used to focus the detection effort and minimize cross correlation and noise errors. The cross-correlation routine relates a portion of the trace of interest within the window to an arbitrarily selected reference or an adjacent signal trace which is considered a baseline result. If within the window, the signal to baseline cross-correlation result exceeds a threshold value, a linear shift is applied to the trace; if not, the trace is zeroed. Alternative window sizes, indicator detection, and shifting methods can be based upon other indicators, baselines, non-linear relationships or other correlation routines.

This alignment procedure produces a series of traces, aligned at the "liner-steel" (typically a concrete liner 5 to steel pipe 3 as shown in FIG. 1) interfacial indicators. Radially outward from the "liner-steel" interface is the adjacent "steel-fluid" interface, wherein the "fluid" referred to is a fluid from the formation 2, rather than the fluid 6 as shown in FIG. 1. In an ideal non-corroded/non-scaled uniform wall condition of the casing shown, the "steel-fluid" indicators are also aligned. However, this indicator shift is not expected to align all actual casing inspections. Although similarly perturbed and arbitrarily realigned, the adjacent "steel-fluid" interface indicator relative to the baseline can be used to determine the casing wall thickness (using the known velocity of the signal in steel) without correcting for signal perturbing liner properties and location. After shifting, the comparison (i.e., difference) between the arrival of the adjacent interfacial and the reference interface indicators is primarily a function of casing properties, not the unknown scale or liner properties.

By using the method, one can detect otherwise hidden (i.e., indicators which are significantly perturbed, such that they are unrecognizable or indistinct) unsafe conditions, such as the presence of corrosive fluids causing thinning and corrosion, without needing to "know" liner or scale conditions. Even if the reference surface is not correctly aligned (i.e., mislocated) or is no longer cylindrical in nature (i.e., an error in the assumed geometry), the differential thickness determined by this method is essentially correct.

The amount of shifting required for alignment can also be used to detect the masked location of an intervening material interface, i.e., a "fluid-liner" interfacial surface (see FIG. 5). A second window, measured from the reference surface indicators to the intervening liner interfacial indicators, is based upon the alignment shift and a range of intervening material (i.e., liner) properties. The second window focuses the detection effort onto a narrow segment of the traces of the data. The narrow segment is where the adjacent intervening material interfacial indicator(s) may be found, even if masked. Use of the narrow window and aligned reference surface again avoids difficulties associated with noise and errors in detecting a masked intervening signal.

After detection of intervening materials and interfaces, other casing/cement conditions can be detected. Signal amplitudes can be corrected for transmission loss, as shown in FIG. 2. Corrected indicators (i.e., corrections made to the signal amplitudes and frequencies of the wave forms) can then be used to determine other casing conditions. This includes the extent of delamination (i.e., liner-steel or steel-cement separation), cement alteration and internal failure, interfacial surface conditions and the presence of formation fluids.

Changes in phase of formation fluids at the exterior wall are detected by a change in the amplitude of the signal being reflected by the exterior wall. Liquids tend to transmit signals differently than vapor; specifically, sonic signals tend to be transmitted from a solid interface immersed in liquid whereas sonic signals tend to be reflected from a solid interface immersed in vapor. Changes in surface impedance depend upon the changes in the type of fluid contacting the surface, e.g., a fluid or a gas behind a casing. For example, liquid brine below a given depth and a vapor cap above that depth will result in changes in the amplitude of the reflected pulse at the exterior tubing wall as a signal source and detector traverse this depth.

Specifically for sonic signal sources and detectors measuring the in-situ condition of an uncemented oil field casing, changes in the acoustic impedance of the type of fluid behind the casing result in changes in the amplitude of the reflected pulse from the casing-fluid boundary. The amplitude of the reflected signal is reduced when liquid is present behind the casing and increased when gas is present. These changes can used to detect natural gas-water or natural gas-oil formation zone boundaries behind a pipe. The boundary plane is typically nearly horizontal due to density differences between the fluids in the formation. As the detector is lowered or raised in the wellbore across the boundary plane, these signal changes indicate the boundary, i.e., the presence or absence of one fluid. Changes in sonic signal amplitude at a water-oil zone boundary are normally not as large, but also may be detectable.

The peak amplitude changes caused by fluid changes behind the casing or cement can be more easily detected and distinguishable from other factors when multiple detectors at a given level are employed as well as multiple signals from a single detector as different levels. Other factors tending to change the signal amplitude may affect only one detector, e.g., a delamination. When all detectors show a consistent change in amplitude of signal reflected by the exterior casing wall over a given depth range, high confidence can be given to the conclusion that a fluid difference over this range behind the casing is the cause.

In addition, reflected peak splitting from certain cemented surfaces may be observed, caused by the increase in interference between the cement-steel and steel-fluid reflections when gas replaces liquid. For example, a cement-steel interface may act as a single amplitude reflection peak when a low impedance formation liquid permeates the interface. However, if a high impedance gas permeates the interface at a higher level, two nearly simultaneous reflections (from gas-steel and a cement-gas interfaces) may occur, splitting the peak amplitude (i.e. causing a double peak).

Figure 7:
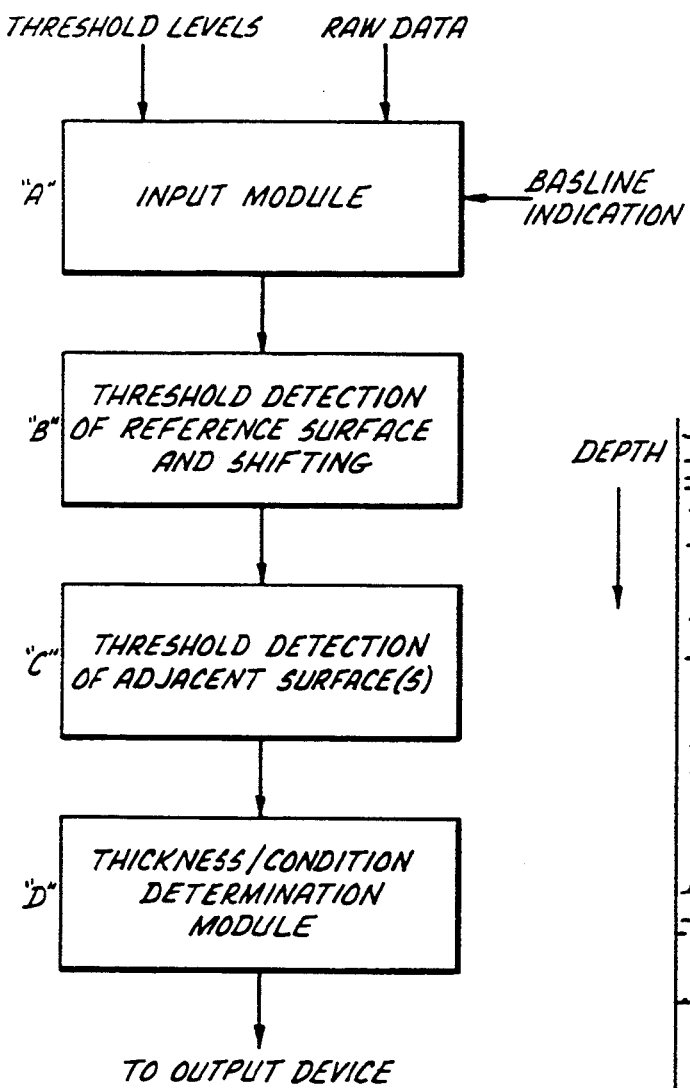
FIG. 7 shows a block diagram of an electrical apparatus which incorporates the invention's method.

FIG. 7 shows a block diagram of an electrical apparatus which incorporates the method of the invention. The input module "A" is in electrical (i.e., signal) communication with the instrument (see item 7 in FIG. 1) and contains means for inputting the logging instrument's raw data signal and related threshold signal/noise inputs, along with reservoir, formation, fluid, and geometry information inputs. The input module may include a digitizing microprocessor and/or a manual keyboard for entry of the data. The input module may have the capability of averaging radial data taken at each depth and means for generating a composite data or signal trace.

The information and data are transmitted to the first threshold detector matrix and computational indicator shifting module "B." A reference surface, such as the "steel-liner" interface shown in FIG. 5, is identified by using a cross-correlation routine. The routine calculates a result from a comparison (made using the routine) between a baseline and the trace of interest within a first window (focusing search). The baseline may also be varied (e.g., using adjacent traces), be a composite of data taken, be an assumed value, or be an indicator taken from a previous instrumental traverse associated with known conditions, e.g., non-scaled/non-eroded well characterized tubulars. Signal cross-correlation and alignment routines, such as the TEEAMP or ALINPUT programs currently available from Western Geophysical, are used. If the signal detected by the cross-correlation routine (comparing signals to an adjacent or composite trace within the window) exceeds a threshold value, a linear shift is applied to the trace, if required. The reference surface is first assumed to be at a relatively constant distance from the instrument as it traverses the wellbore axis. If the cross-correlation routine does not detect a signal which exceeds the threshold, the trace is zeroed or flagged. Hence, only the non-zeroed/non-flagged traces are shifted an optimum amount with respect to the nominal, reference, baseline or adjacent traces.

The optimum amount of the shift applied to a non-zeroed trace is determined by calculating a correlation coefficient for the adjacent/composite and the to be shifted trace. The optimal shift is obtained by a linear shift which produces the largest correlation coefficient.

As an alternative, an initial or pre-shift of the data is also possible. An initial shift may be determined by estimating the properties of any intervening layer(s). This pre-shift estimate may be based upon available data, such as operating time since the previous baseline, or assumed data, such as geometry. This allows for initial corrections of unknown, but suspected changes in liner (e.g., thickness loss resulting from erosion) or scale properties. Using this alternative may not completely result in the desired alignment of the reference signals, but may allow for the use of a narrowed first window and simplify the remaining shifting procedures. Other correlation and optimal shifting techniques, such as those using incrementally increasing window sizes and a regression coefficient analysis having various degrees of freedom, may also be used in alternative methods.

In an alternative embodiment, if the assumed constant radial distance to the reference surface needs to be verified, an iterative process would be employed. For example if casing wall thinning and protective liner cracking (caused by corrosion, erosion or shrinkage) are detected, the reference surface may no longer be at a constant radial distance from the logging instrument. A composite of both of the shifted steel interface signals (i.e., inside and outside steel surfaces) or a new baseline reference surface (i.e., outside steel surface) can be used in an iterative process to calculate a new (i.e., iterated) shift or pre-shift from the baseline condition. An iterated shifting of the signals, similar to the initial shift discussed above, can then be accomplished. Cross-correlation techniques can then again be used to iteratively converge on an optimum shift of the data.

The detected and optimally shifted data is then transmitted to a second threshold detector "C." Signal indicators from one or more adjacent interfaces, such as the remaining (outward facing) steel surface of the metallic casing, are detected within a differential or relative window (measured relative to the shifted first surface signal). If the adjacent interfacial indicator signal exceeds a second threshold, detection is registered, if not, the trace is zeroed or flagged in a manner similar to that referred to in step "B".

The adjacent interface or material indicators may include a change in phase, amplitude (e.g, damping of the "peak" or "trough" magnitudes), frequency (i.e., resulting from resonance), direction, and/or vibrating plane orientation. A combination of signal indicators may also be used to detect a condition or property of an adjoining material or interface.

The remaining, otherwise masked, surface and material signal indicators can now be differentially detected from these adjacent interfacial indicators. A differential window from one interface to another can be used to focus the search for these adjacent indicators within an expected range, similar to the detection of adjacent reference interfacial indicators.

The thickness of the casing and other conditions (of the casing and remaining materials) are determined at the computational module "D." The determination of thickness is based upon the travel time difference between adjacent surface(s) and linear wave velocity through the casing material. If the casing is hung within the borehole, the phase and amplitude of the shifted signal indicator representing the outside surface of the casing with the borehole annulus can be used to indicate the presence of a bore hole fluid and hence serve as a fluid level indicator within the annulus. The annular (outside casing, such as between casing and wellbore) fluid may be a fluid of unknown or uncertain composition, a naturally occurring formation fluid, or leakage of contained fluids 6 (see FIG. 1), or an introduced fluid such as packer fluids, drilling muds, and blanketing fluids such as gaseous nitrogen. Other calculations can be used to determine other liner, cement, and casing conditions.

In an alternative embodiment, a discrete signal source and/or just a detector may be placed proximate to the outside of a pipe which tends to have an outer surface lining and/or scale as well as being subject to an unknown amount of corrosion and/or scaling, such as found in boiler tubing and shell-in-tube heat exchangers. The method would detect the presence or absence of fluids at the interior surface. In other alternative embodiments, similar methods can be used to detect the presence of absence of fluids at other locations, such as within laminar materials. This can include detecting changes in laminar composition slabs or multi-layer pipe (such as laminated fiberglass materials) through an intervening outer thermal insulation or protective layer which may have degraded an uncertain amount (i.e., detector is placed near the outside thermal insulation layer rather than at the pipe interior), and determining the presence or absence of fluids at interior locations in composite materials for quality control or other purposes.

Although the preferred embodiment uses a sonic wave signal, the method can also use indicators associated with (i.e., part of) electromagnetic fields or wave forms. For example, if the induced frequencies of an electromagnetic wave are indicators of the thicknesses of several layers and these frequencies are perturbed by the formation of a conductive fluid or magnetic scale or precipitate contacting the layer, the presence or absence of fluid (or the scale/precipitate residue from the contact) are determinable from the perturbed indicators. The frequency associated with the first layer is first detected at one point, associated with a baseline thickness (selected arbitrarily or otherwise) within a first window, and the frequencies at the remaining points shifted, analogous to that discussed returning sonic wave forms. The shifting of indicators and signals is based upon as much knowledge of the reference layer and contacting fluid/scale layer as possible, e.g., the first layer thickness is least likely to be changed from the assumed condition and the signal perturbing scale layer is expected to have an assumed shape, but an unknown thickness. The shift may not be linear, as in the sonic case noted above, but can be calculated or predicted form assumed conditions which affect the signal/indicators. A second layer frequency is then detected within a second window from the shifted data, again similar to the prior discussion. Relative changes in contacting fluid/scale can thus be obtained, even in the absence of absolute knowledge, analogous to the sonic embodiment. Iteration may again be used to improve the accuracy of the assumptions and indicated properties.

While the preferred embodiment of the invention has been shown and described and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A method for determining the presence of a fluid contacting an outer surface of an underground pipe, said determining method using a sonic signal produced by a wire line logging instrument placed radially inward from an inner surface of said pipe, at least a portion of said signal being capable of reflection and the reflected portion detected by said instrument and wherein the detected signal has an indicator of each of said surfaces, with the indicator of said outer surface being affected by a property of said fluid contacting said outer surface, which method comprises the steps of:
    a) placing said instrument in an underground location proximate to the major axis of said pipe;
    b) generating a first sonic signal;
    c) detecting a first reflected signal from said placed instrument;
    d) discerning the location and amplitude of said outer surface indicator in said first reflected signal;
    e) changing the axial location of said instrument;
    f) generating a second sonic signal;
    g) detecting a second reflected signal at the changed location;
    h) discerning the location and amplitude of said outer surface indicator in said second reflected signal; and
    i) determining the presence of said fluid contacting said outer surface from a calculation dependent upon a difference between said discerned indicators.

2. The method of claim 1 wherein said discerning steps also comprise discerning the location of a reference surface indicator and linearly shifting at least a portion of said outer and inner surface indicators based upon a correlation to said reference surface indicator.

3. A method for determining a generally uncertain presence of a fluid contacting at least a portion of a fluid conduit, said method using an instrument capable of detecting a fluid conduit affected signal having an indicator of a fluid conduit property wherein the presence of said fluid also affects said indicator, which method comprises the steps of:
    a) generating a signal capable of being affected by said conduit;
    b) placing said instrument in the vicinity of said fluid conduit where said affected signal can be detected;
    c) detecting a first affected signal from said placed instrument;
    d) moving said instrument and detecting a second affected signal from the moved instrument;
    e) discerning said affected indicators in said detected signals; and
    f) determining the presence or absence of said fluid contacting said conduit from a calculation dependent at least in part upon comparing said detected indicators.

4. The method of claim 3 wherein said fluid conduit has a major axis and said conduit comprises a first radially outward layer and a second radially inward layer wherein said generally uncertain fluid is in contact with said first layer, wherein:
    said detecting step also comprises traversing the instrument proximate to said second layer and obtaining a plurality of said affected signals; and
    said determining step also comprises comparing said discerned indicators to a reference first layer property indicator.

5. The method of claim 4 wherein said reference first layer indicator is calculated based upon at least a portion of one of said plurality of affected signals.

6. The method of claim 5 wherein said determining step also comprises linearly shifting at least a portion of said indicators based upon a correlation to said reference indicator.

7. An inspection method for determining an otherwise uncertain presence of a fluid contacting at least a portion of one layer of a multi-layered material using a signal generator capable of producing a distinct signal directed towards said material, wherein said directed signal is affected by said conduit, said method also using at least one detector capable of detecting a conduit-affected signal having an indicator of a conduit property, said indicator affected the presence of said fluid, which method comprises the steps of:
    a) placing said signal generator and said signal detector at locations in signal communication, said signal detector spaced apart from one of said layers;
    b) moving said detector in a direction which generally maintains said distance to said one layer;

c) producing a series of said distinct signals from the moved detector and a series of conduit-affected signals;

d) detecting said indicator within said series of conduit-affected signals; and e) comparing said indicator within said series to determine the presence or absence of said fluid.

8. The method of claim 7 wherein said multi-layered material comprises a fluid-conducting conduit located within a subsurface borehole, wherein said detecting step also comprises selecting a first indicator window calculated from an expected range of said indicator within said conduit-affected signal and selecting said indicator within said window.

9. The method of claim 8 wherein said detecting step also comprises linearly shifting said indicator in a signal when said detector is at one location of said detector with respect to an indicator when said detector is at another location.

10. The method of claim 9 wherein said detector and said signal generator are located within an instrument located proximate to a major axis of said conduit and wherein said traversing step also comprises moving said instrument in a direction along said axis and wherein the linearly shifting produces an aligned series of indicators.

11. The method of claim 10 wherein said distinct signal is sonic and said conduit property is a first surface of a layer and said conduit-affected signals include indicators of a second surface, which method also comprises the steps of:

f) calculating a second surface indicator window from the expected time difference between arrival times of said indicators of said first surface location and said second surface location within said aligned series;

g) detecting the amplitude above a threshold value of a second surface indicator at one detector location within said aligned series and within said second window;

h) detecting the amplitude above a threshold value of a second surface indicator at another detector location within said aligned series and within said second window; and i) comparing said indicators within said series to determine the presence or absence of said fluid.

12. The method of claim 11 wherein said first surface is a first layer to second layer interface, and wherein said second surface is covered by a third layer, said method also comprising the steps of:

j) calculating a third indicator window based upon the difference in an expected range of arrival times of said second surface indicator and a third indicator of a third layer property, based in part upon the speed of said signal through said materials; and k) detecting said third property indicator within said shifted data signals within said third window.

13. The method of claim 12 which also comprises the steps of:

l) calculating an iterated indicator of said first surface based upon said detected second and third property indicators; and n) repeating steps f through k using the iterated indicator.

14. The method of claim 13 wherein the presence or absence of said fluid over a range of locations is required to safely operate said conduit, which method also comprises the steps:

m) comparing whether the determined locations where said fluid is present or absent are within the safe operating range for conduit operation; and t) correcting said conduit operation when said fluid is outside said safe operating range.

15. The method of claim 14 wherein said determination step also comprises correcting indicators for signal transmission loss.

16. The method of claim 2 wherein said instrument detects electromagnetic waves having frequency indicators.

17. An apparatus for the determination of the presence or absence of a fluid in contact with a conduit, which apparatus comprises:

a signal generator generally located within said conduit, said signal generator being capable of producing a signal affected by said conduit and resulting in a conduit-affected signal having a conduit property indicator altered an incremental amount by the presence of said fluid;

a conduit traversable means for detecting said affected signal, the detecting means located within said conduit and capable of detecting a plurality of said affected signals when said detecting means is traversing said fluid conduit;

means for discerning said indicator within said plurality of affected signals; and means for comparing discerned indicators for the increment amount indicating the presence of said fluid.

18. The apparatus of claim 17 which also comprises: means for selecting a baseline indicator; and means for shifting at least a portion of said discerned indicators based upon said baseline indicator, wherein said shifting means is capable of producing a shifted indicator.

19. The apparatus of claim 18 wherein said means for detecting also comprises an affected signal detector and a signal encoding module in signal communication with said affected signal detector and said signal generator.

20. The apparatus of claim 19 wherein said means for shifting comprises:

a computational matrix in signal communication with said encoding module, said computational matrix capable of computing a structural layer property value from a mathematical relationship depending upon a said shifted indicator; and means for outputting the computed structural layer property value.

21. An inspection method for determining an otherwise uncertain presence of a fluid contacting at least a portion of one surface of a solid material, said method comprising:

a) placing a signal generator capable of producing a distinct signal directed towards said material at a first location, wherein said directed signal is affected by said conduit;

b) placing a signal detector at a second location in signal communication with said signal generator and spaced apart from said one surface of said material at a first distance, said signal detector capable of detecting a conduit-affected signal having an indicator of a conduit property, said indicator also being affected an incremental amount by the presence of said fluid;

c) moving said detector to other locations in signal communication with said signal generator, said moving being in a direction which generally maintains said first distance;

d) producing a series of said distinct signals from the moved detector and a series of conduit-affected signals;

e) detecting said indicator within said series of conduit-affected signals; and f) comparing said indicators within said series to determine the presence or absence of said incremental amount indicating the presence or absence of said fluid.

* * * * *